United States Patent [19]
Sato et al.

[11] 3,772,694
[45] Nov. 13, 1973

[54] METHOD OF PROTECTING PASSENGERS IN A MOVING VEHICLE UPON COLLISION THEREOF

[75] Inventors: Kazuo Sato; Tomio Hisatsune, both of Toyota, Japan

[73] Assignee: Toyota Jidosha Kogyo Kabushiki Kaisha, Toyota-shi, Aichi-ken, Japan

[22] Filed: Feb. 9, 1971

[21] Appl. No.: 113,896

[30] Foreign Application Priority Data
Feb. 19, 1970 Japan.................. 45/13818

[52] U.S. Cl. ............... 343/7 ED, 180/82, 343/8, 343/112 CA
[51] Int. Cl. ............................................. G01s 9/46
[58] Field of Search ................ 343/112 CA, 7 ED, 343/8; 180/82, 105, 106

[56] References Cited
UNITED STATES PATENTS

| | | | |
|---|---|---|---|
| 3,448,822 | 6/1969 | La Lone et al. | 343/7 ED |
| 2,702,342 | 2/1955 | Korman | 343/112 CA |
| 3,152,326 | 10/1964 | Merlo | 343/7 ED |
| 2,188,293 | 1/1940 | Williams | 343/112 CA |
| 3,114,147 | 12/1963 | Koecken | 343/112 CA |

Primary Examiner—Benjamin A. Borchelt
Assistant Examiner—G. E. Montone
Attorney—Toren & McGeady

[57] ABSTRACT

The disclosed apparatus anticipates an impending vehicle collision by detecting the Doppler shift caused by an oncoming object and actuating a passenger protecting device. An antenna radiates a horizontally spread pattern of ultra-short wave signals and senses signals reflected by an oncoming object. A homodyne detector mixes the radiated and reflected signals to produce a Doppler frequency. A converter responds to the amplitude of the Doppler frequency and produces a first safety signal when the converter determines that the object is within a predetermined zone. A frequency-voltage converter converts the Doppler frequency into a voltage. A comparator compares the voltage with a second smaller voltage that is derived from the first voltage but whose rate of change is dampened. The comparator produces a second safety signal when the first voltage exceeds the second after a given time. A gate actuates air bags when both safety signals appear.

9 Claims, 4 Drawing Figures

METHOD OF PROTECTING PASSENGERS IN A MOVING VEHICLE UPON COLLISION THEREOF

BACKGROUND OF THE INVENTION

This invention relates to a vehicle collision sensing system wherein a vehicle collision is detected in advance from the change rate of the difference frequency between the undulatory signal radiated from a vehicle and the wave signal reflected from an on-coming vehicle and received with its frequency deviated due to the Doppler effect.

Anticipating a vehicle crash is necessary to compensate for the delay time of the actuation of a passenger protecting device such as air bag or the like. For example, in systems wherein the protecting device is actuated by detecting the impact of a crash, it is necessary to minimize the time required to complete the actuation of such protecting device. Therefore, such systems employ the explosive force of gundpowder or the like for the inflation of air bags. However, this system may inflict secondary injuries on passengers due to the rapid inflation of the air bags.

In a proposed collision — sensing system the relative velocity and the relative distance between vehicles are determined by detecting the frequency deviation due to the Doppler effect and the signal level when the wave signal radiated from a vehicle and reflected from an on-coming vehicle is again received by the signal radiating vehicle, thus actuating a passenger protecting device within a predetermined time allowance only when the relative velocity exceeds the critical velocity.

The object of this invention is to provide a vehicle collision sensing system capable of detecting whether or not two on-coming vehicles are in a crash region, thus preventing unwanted actuation of a passenger protecting device when said vehicles pass each other without colliding. Such system should be capable of detecting a vehicle collision in advance by employing a single receiving antenna. Thus, erroneous operation of the protecting device can be prevented.

In the vehicle collision sensing system according to this invention, the wave signal radiated from a vehicle and reflected from an on-coming object is received at a point on said vehicle and an electrical quantity proportional to the difference frequency between the frequency of the reflected wave signal and that of the radiated wave signal is obtained, thus detecting a collision in advance from the change rate of said quantity of electricity.

DESCRIPTION OF A PREFERRED EMBODIMENT

Figure 1:
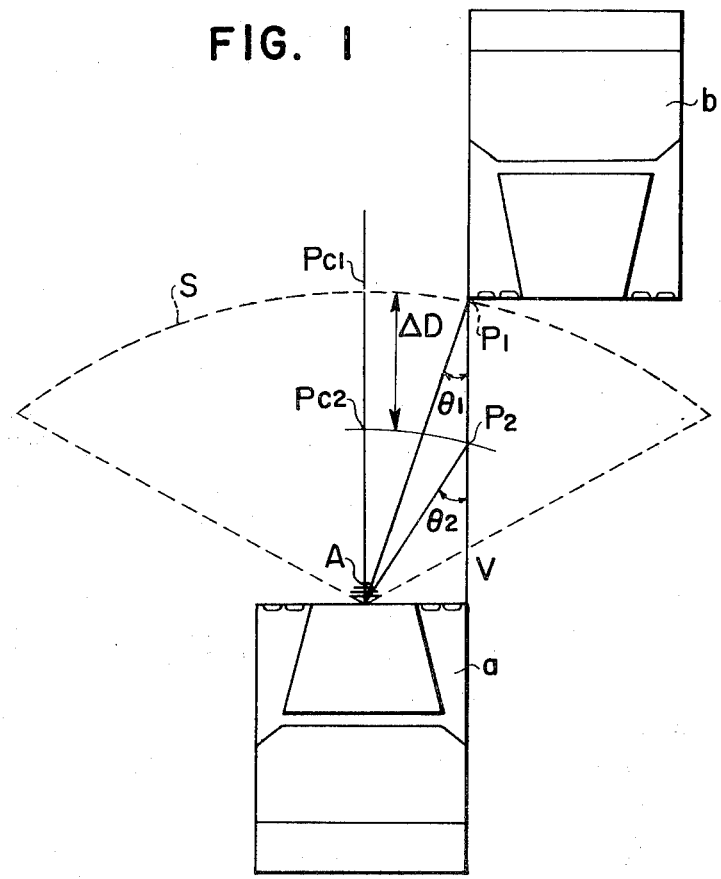
FIG. 1 is a plan view illustrating the relative position of two on-coming vehicles in order to facilitate the explanation of the vehicle collision sensing system according to this invention.

Referring now to FIG. 1, a vehicle $a$ has a collision sensing device mounted thereon. An antenna A for transmitting and receiving wave signal is installed in the front portion of the vehicle. An on-coming vehicle is indicated by $b$. An object detecting region S is defined by the directivity of the antenna A. Two vehicles $a$ and $b$ are approaching on parallel lines and the direction of their relative velocity $v$ is indicated by the arrow. In the illustrated case, the vehicle $b$ is in the critical region of a crash with respect to the vehicle $a$ and the front corner at one side of the vehicle $b$ has come within the region S. When the wave signal radiated from the antenna A is reflected from the surface of the vehicle $b$, the greater part of the wave signal to be received by the antenna A is a signal reflected from a point on the vehicle $b$ which is nearest to the antenna A, that is, the point $P_1$ in the illustrated case. This point $P_1$ is designated as the "equivalent reflection point."

The point $P_2$ is the equivalent reflection point which exists when the relative distance shortens by $\Delta D$. The angles formed by the travelling directions of the wave signals with respect to the points $P_1$ and $P_2$ and the direction of the relative velocity $v$ are indicated by $\Theta_1$ and $\Theta_2$, respectively. The points $P_{C1}$ and $P_{C2}$ are the equivalent reflection points before and after the relative distance shortens by $\Delta D$, respectively, when the center lines of the vehicles $a$ and $b$ lie along the same line.

Let the angle made by the travelling direction of the wave signal and the direction of the relative velocity $v$ be $\Theta$ and the frequency of the radiated wave signal and the propagation velocity thereof be $f_t$ and C, respectively. Then, the difference frequency between the frequency of the reflected wave signal and that of the reflected wave signal, that is, the frequency $f_d$ of the Doppler signal, is expressed as follows.

$$f_d = (2vf_t/C) \cos \Theta \quad (1)$$

Consequently, the frequencies $f_{d1}$ and $f_{d2}$ of the Doppler signals at the points $P_1$ and $P_2$ are $$f_{d1} = (2vf_t/C) \cos \Theta_1 \quad (2)$$

$$f_{d2} = (2vf_t/C) \cos \Theta_2 \quad (3)$$

The ratio of the quantities of electricity $V_1$ and $V_2$ proportional to these frequencies are given as follows.

$$V_2/V_1 = \cos \Theta_2 / \cos \Theta_1 \quad (4)$$

If the distance $\Delta D$ is taken as a certain constant value, this ratio $V_2/V_1$ becomes gradually larger as the center lines of the vehicles $a$ and $b$ approach each other. When these lines coincide, $\Theta_1 = \Theta_2 = 0$, and consequently $V_2/V_1 = 1$. If these center lines move away from each other, the ratio $V_2/V_1$ is gradually decreased.

Therefore, if the ratio $V_2/V_1$ is expressed by $x$ when the vehicles $a$ and $b$ are in the crash critical region as illustrated, a collision is predicted when $V_2/V_1$ is larger than $x$. When $V_2/V_1$ is smaller than $x$, it will be apparent that no crash will take place.

The ratio $V_2/V_1$ can be obtained by setting the distance $\Delta D$ as the decreasing amount of the relative distance between vehicles within a unit of time. Also, the occurence of a crash can be determined from the change rate of the Doppler signal frequency at the time when the relative distance between vehicles becomes a predetermined constant value irrespective of the magnitude of the relative velocity $v$.

Figure 2:
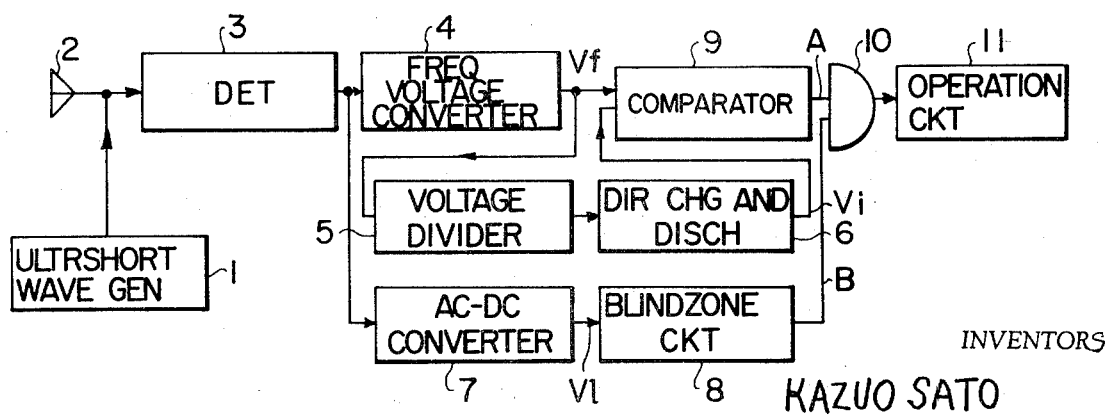
FIG. 2 is a block diagram of an example of a device built for carrying out the principles of the vehicle collision sensing system according to this invention.

The collision sensing device shown in FIG. 2 gives advance indication of a crash by detecting the decrease rate of the Doppler signal frequency when the relative distance between vehicles shortens to a given set value. The reference numeral 1 identifies an ultrashortwave generator, 2 an antenna and 3 a detector. In the detector 3, the radiated ultrashortwave signal is mixed with the reflected ultrashort wave signal and a signal having a frequency equal to the difference frequency between the two signals, that is, the Doppler signal, is obtained by means of the homodyne detection. The Doppler signal is passed to a frequency-voltage converter 4 and an AC-DC converter 7. In the converter 4, a voltage $V_f$ proportional to the frequency of the Doppler signal is developed. On the other hand, a voltage $V_t$ proportional to the level of the Doppler signal is developed in the converter 7.

The voltage $V_f$ is passed directly passed to a comparator 9 and is also passed as a voltage $V_i$ through a voltage divider 5 and a directional charge and discharge circuit 6 to the comparator 9. As long as the voltage $V_f$ is higher than the voltage $V_i$, the comparator 9 applies an output A to an "and" circuit 10. A blind zone circuit 8 applies an output B to the "and" circuit 10 when the voltage $V_t$ exceeds a certain set value. The "and" circuit 10 applies an actuating signal to an operation circuit 11 of a passenger protecting device when the outputs A and B appear simultaneously. The actuating signal puts the protecting device into operation.

It has been discovered from experiments that the changes in the voltage $V_t$ proportional to the level of the Doppler signal are inversely proportional to the relative distance between vehicles when they are in the nearest distance. Therefore, if the distance between vehicles is decreased below a certain value, the voltage $V_t$ exceeds the set value. Based on this fact, the system determines that the relative distance between vehicles has been reduced to a certain set distance.

Figure 3:
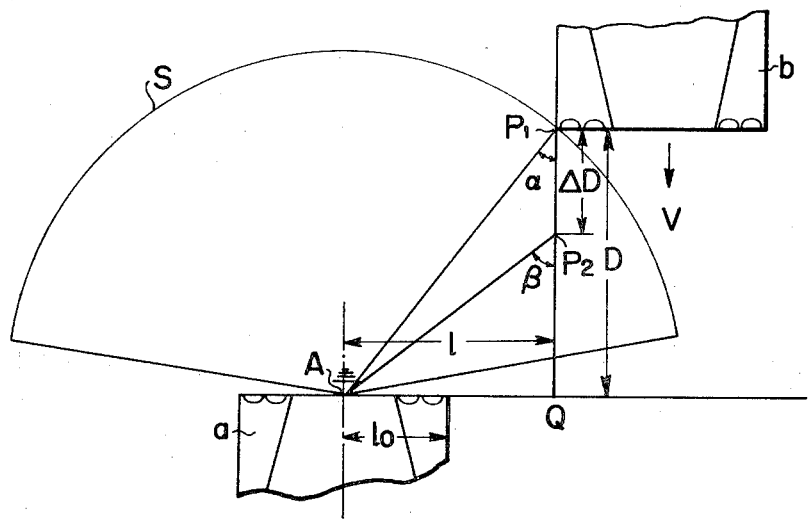
FIG. 3 is a plan view corresponding to FIG. 1.

There exists a relationship between the changes in the voltage $V_f$ proportional to the frequency of the Doppler signal and the output voltage $V_i$ of the directional charge and discharge circuit 6. As shown in FIG. 3, when the vehicle $b$ enters the object detecting region S, the equivalent reflection point $P_1$ is separated from the antenna A of the vehicle $a$ by $l$ in the lateral horizontal direction. Let the relative forward distance be D. The point $P_2$ is the equivalent reflection point at the time when the relative forward distance shortens by $\Delta D$. The angles made by the travelling directions of the wave signals at the points $P_1$ and $P_2$ and the direction of the relative velocity $v$ are indicated by $\alpha$ and $\beta$.

As is apparent from FIG. 3, $$\cos \alpha = D \sqrt{D^2 + l^2} \tag{5}$$

$$\cos \beta = D - \Delta D \sqrt{(D-\Delta D)^2 + l^2} \tag{6}$$

Let the time in which the point $P_1$ moves to the point $P_2$ be $t$. Then, the distance $\Delta D$ is proportional to $vt$.

Consequently, the equation (6) is rewritten as follows.

$$\cos \beta = D - vt/ \sqrt{(D-vt)^2 + l^2} \tag{7}$$

By substituting the above equation into the equation (1), $$f_d = (2vf_t/C) \cdot (D - vt/ \sqrt{D - vt)^2 + l^2}) \tag{8}$$

As the voltage $V_f$ to be obtained by the frequency-voltage converter 4 is proportional to the frequency $f_d$ of the Doppler signal, the following equation is obtained.

$$V_f = K \cdot (2vft/c \cdot (D - vt/ \sqrt{D - vt)^2 + l^2}) \tag{9}$$

Where, K is the conversion coefficient.

The conversion coefficient K, the frequency $f_t$ of the radiated wave signal and the propagation velocity $c$ are constant. Therefore, the distance D of the point $P_1$ on the region S is determined if the distance $l$ is known. Consequently, if the voltage $V_f$ with respect to the time $t$ is plotted by setting the relative velocity $v$ at a certain value and using the distance $l$ as the parameter, the curves I, II and III as shown in full line in FIG. 4 will be obtained.

The curve I indicates conditions when $l= o$. The curve II indicates conditions when $l= lo$, and the curve III the case when $l= D$ the value. $lo$ is one half of the vehicle width of the vehicle $a$. Therefore, the curve II indicates the changes in the voltage $V_f$ when $l$ is in the crash critical region. The curves I', II' and III' shown in dotted line indicate the changes in the voltage $V_t$ when the voltage $V_f$ of the curves I, II and III is being applied, respectively.

If, for example, the change rate of the output of the voltage divider 5 is lower than the voltage drop rate to be determined depending on the discharge time constant of the directional charge and discharge circuit 6, the circuit 6 generates the input voltage thereof as it is. When the change rate of the output of the voltage divider 5 becomes higher than the voltage drop rate in the circuit 6, the voltage that decreases due to the discharge time constant of the circuit 6 irrespective of the output of the voltage divider 5 is generated.

Figure 4:
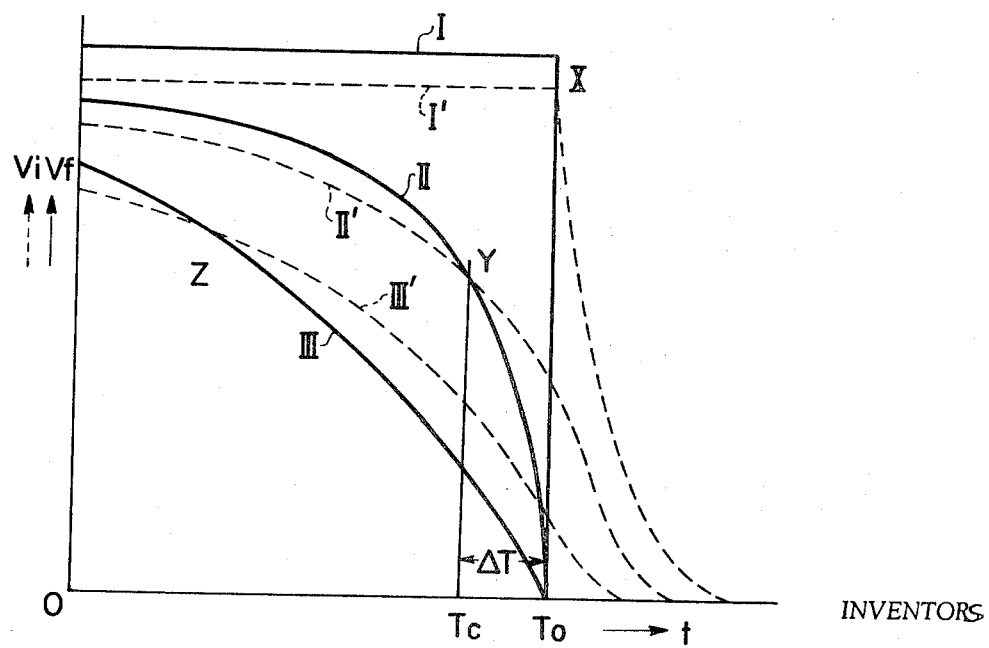
FIG. 4 is a voltage characteristic diagram for the explanation of the operation of the device of FIG. 2.

The time $T_o$ taken on the abscissas in FIG. 4 indicates the time required for the point $P_1$ to reach the point Q. At this time, as is apparent from the formula (9), $D-vt = D-vT_o = 0$. Consequently, $V_f = 0$. On the curve I, $V_f = K \cdot (2vf_t/c)$ until the time $T_o$, and therefore the voltage is constant. On the curve I', the voltage is lower which is determined by the divided voltage ratio in the voltage divider 5. As already described, $l=0$ in this case, and therefore a collsion will collision place.

The curve II indicates a situation when $l=lo$ and starts to decrease rapidly near the time $T_c$. Therefore, the drop rate near this time point becomes higher than the voltage drop rate determined by the discharge time constant of the circuit 6. Thus, the curve II' descreases at the voltage drop rate inherent in the circuit 6, thus producing the intersection Y.

In the curve III, the drop rate is high from its beginning. Therefore, the curve III' decreases at the voltage drop rate inherent in the circuit 6 from the earlier time, thus producing the intersection Z at the time earlier than the time $T_c$. It is predicted that the intersection X between the curve I and the curve I' is obtained at the time $T_o$.

As described above, the intersections X, Y and Z are changed in accordance with the magnitude of the distance $l$. If the distance is larger than the distance $lo$, the intersections are produced at the time earlier than the time $T_c$. Based on this fact, by comparing the voltage $V_f$ and $V_i$ at the time earlier than the time $T_c$, the comparator will detect that the distance $l$ is smaller than the distance $lo$ if the voltage $V_f$ is higher than the voltage $V_i$. Thus, in the device shown in FIG. 2, the time $T_c$ is established as the time when the voltage $V_i$ proportional to the level of the Doppler signal exceeds a certain set value. The occurence of a collision is anticipated when both outputs A and B exist. Operation circuit 11 is then actuated.

As is apparent from equation (9), the distance D in the crash critical region in the numerator $(D - v_t)$ is determined by the directivity of the antenna A, and therefore the time $T_o$ determined by $D/v$ is inversely proportional to relative velocity $v$. The time $T_c$ is also inversely proportional to the relative velocity. Consequently, the time $T_c$ is at the constant ratio with respect to the time $T_o$ irrespective of the relative velocity $v$. Therefore, the change rate of the voltage $V_f$ at the time $T_o$ is almost constant irrespective of the relative velocity $v$. From the above described, the crash critical region can be accurately determined by setting the discharge time constant of the directional charge and discharge circuit 6 at a certain value.

Whether vehicles may collide or they pass each other can be decided by means of the collision sensing system according to this invention. Thus, it becomes possible to prevent arrnoneous operation of a passenger protecting device. Moreover, it becomes possible to avoid sudden actuation of the protecting device by detecting a possible collision well in advance before the occurence of the actual crash, thus preventing secondary injuries from being incurred.

What is claimed is:

1. A collision sensing apparatus for a vehicle, comprising signal operating means mounted on said vehicle for transmitting an undulatory signal and for sensing reflections of the signal from an object, Doppler means for deriving a first electrical value varying with the difference between the frequency of the transmitted signal and the reflected signal and for deriving a varying electrical level corresponding to the amplitude of the received signal, charge and discharge means responsive to the value for producing a second electrical value having a predetermined relation with the first value and variable at a rate slower than the first value, comparator means for comparing said values and producing a signal when the first value has a given relation with the second value, level responsive means coupled said Doppler means for producing a signal when the level line within a predetermined zone, and gate means responsive to the signals from said level responsive means and said comparator means for producing a safety actuating signal in response to the existence of said signals at said level responsive means and said comparator means.

2. A system as in claim 1. wherein said Doppler means includes a Doppler detector for producing the frequency difference and frequency-voltage converter means responsive to said detector for producing the first value.

3. An apparatus as in claim 2, wherein said charge and discharge means includes voltage divider means responsive to the output of said frequency-voltage converter means for producing a voltage, said charge and discharge means including discharge means coupled to said voltage divider means for limiting the rate of change of the voltage and forming the second value, said comparator means including a comparator circuit coupled to said Doppler means and said discharge means for comparing the first electrical value with the second electrical value.

4. An apparatus as in claim 3, wherein said comparator circuit produces the first signal when the first electrical value exceeds the second electrical value.

5. An apparatus as in claim 2, wherein said level responsive means includes an alternating current to direct current converter and zone selecting means.

6. An apparatus as in claim 5, wherein said charge and discharge means includes voltage divider means responsive to the output of said frequency-voltage converter means for producing a voltage, said charge and discharge means including discharge means coupled to said voltage divider means for limiting the rate of change of the voltage and forming the second value, said comparator means including a comparator circuit coupled to said Doppler means and said discharge means for comparing the first electrical value with the second electrical value.

7. An apparatus as in claim 6, wherein said comparator circuit produces the first signal when the first electrical value exceeds the second electrical value.

8. A safety apparatus for a vehicle, comprising signal operating means mounted on said vehicle for transmitting an undulatory signal and for sensing reflections of the signal from an object, Doppler means for deriving a first electrical value varying with the difference between the freguency of the transmitted signal and the reflected signal and for deriving a varying electrical level corresponding to the amplitude of the received signal, charge and discharge means responsive to the value for producing a second electrical value having a predetermined relation with the first value and variable at a rate slower than the first value, comparator means for comparing said values and producing a signal when the first value has a given relation with the second value, level responsive means coupled to Doppler means for producing a signal when the level lies within a predetermined zone, and gate means responsive to the signals from said level responsive means and said comparator means for producing a safety actuating signal in response to the existence of said signals at said level responsive means said comparator means, and airbag means in said vehicle connected to said gate means and having an initiating circuit responsive to said gate means for blowing up airbags in the paths of passengers in response to the safety actuating signal so as to protect passengers in the vehicle.

9. An apparatus as in claim 8, wherein said Doppler means includes a Doppler detector and frequency-voltage converter means responsive to the detector for producing the first value, and wherein said comparator means includes voltage divider means responsive to the output of said frequency-voltage converter means for producing a voltage, said charge and discharge means including discharge means coupled to said voltage divider means for limiting the rate of change of the voltage and forming the second value, said comparator means including a comparator circuit coupled to said Doppler means and said discharge means for comparing the first electrical value with the second electrical value, said comparator circuit producing the first signal when the electrical value exceeds the second electrical value.

* * * * *